US012601670B2

(12) United States Patent
Zimmer et al.

(10) Patent No.: US 12,601,670 B2
(45) Date of Patent: Apr. 14, 2026

(54) CONTROLLING A VISCOSITY OF FUEL IN A FUEL CONTROL SYSTEM WITH A VIBRATORY METER

(71) Applicant: Micro Motion, Inc., Boulder, CO (US)

(72) Inventors: Patrick John Zimmer, Denver, CO (US); Steven M Jones, Erie, CO (US); John Ansdell Houghton, Holmfirth (GB); Paul Benedetti, Loveland, CO (US)

(73) Assignee: Micro Motion, Inc., Boulder, CO (US)

( * ) Notice: Subject to any disclaimer, the term of this patent is extended or adjusted under 35 U.S.C. 154(b) by 16 days.

(21) Appl. No.: 18/914,627

(22) Filed: Oct. 14, 2024

(65) Prior Publication Data

US 2025/0035528 A1     Jan. 30, 2025

Related U.S. Application Data

(62) Division of application No. 15/577,893, filed as application No. PCT/US2015/034647 on Jun. 8, 2015, now Pat. No. 12,169,169.

(51) Int. Cl.
*G01N 11/16* (2006.01)
*F02D 33/00* (2006.01)
(Continued)

(52) U.S. Cl.
CPC ........... *G01N 11/16* (2013.01); *F02D 33/003* (2013.01); *F02D 41/0025* (2013.01);
(Continued)

(58) Field of Classification Search
CPC .. G01N 11/16; G01N 29/022; G01N 29/4436; G01N 2291/022;
(Continued)

(56) References Cited

U.S. PATENT DOCUMENTS 3,762,429 A     10/1973   Fitzgerald
4,704,898 A     11/1987   Thone
(Continued)

FOREIGN PATENT DOCUMENTS

EP     0233408 A2     8/1987
EP     2333276 A1     6/2011
(Continued)

OTHER PUBLICATIONS

Irina Nita and Sibel Geacai, Study of density and viscosity variation with temperature for fuels used for Diesel engine, Ovidius University Annals of Chemistry, vol. 22, No. 1, pp. 57-61, 2011, Ovidius University of Constanta, Department of Chemical Engineering and Technology, 124 Mamaia Blvd, 900527 Constanta, Romania.
(Continued)

*Primary Examiner* — Grant Moubry
*Assistant Examiner* — Ruben Picon-Feliciano
(74) *Attorney, Agent, or Firm* — The Ollila Law Group LLC

(57)     ABSTRACT

A method of controlling a viscosity of fuel in a fuel control system with a vibratory meter is provided. The method includes providing the fuel to the vibratory meter, measuring a property of the fuel with the vibratory meter, and generating a signal based on the measured property of the fuel. The method also includes providing the signal to a temperature control unit configured to control the temperature of the fuel provided to the vibratory meter.

6 Claims, 5 Drawing Sheets

(51) Int. Cl.

| | |
|---|---|
| *F02D 41/00* | (2006.01) |
| *F02D 41/06* | (2006.01) |
| *F02M 37/00* | (2006.01) |
| *G01F 1/84* | (2006.01) |
| *G01N 29/02* | (2006.01) |
| *G01N 29/44* | (2006.01) |
| *G05D 24/02* | (2006.01) |

(52) U.S. Cl.

CPC ....... *F02M 37/0064* (2013.01); *G01N 29/022* (2013.01); *G01N 29/4436* (2013.01); *G05D 24/02* (2013.01); *F02D 41/064* (2013.01); *F02D 2200/0611* (2013.01); *G01F 1/84* (2013.01); *G01N 2291/022* (2013.01); *G01N 2291/0226* (2013.01); *G01N 2291/02818* (2013.01)

(58) Field of Classification Search

CPC .. G01N 2291/0226; G01N 2291/02818; F02D 33/003; F02D 41/0025; F02D 41/064; F02D 2200/0611; F02M 37/0064; G05D 24/02; G01F 1/84

See application file for complete search history.

(56) References Cited

U.S. PATENT DOCUMENTS

| | | | |
|---|---|---|---|
| 5,877,409 A | 3/1999 | Girling |
| 6,872,071 B1 | 3/2005 | Durst |
| 2008/0228424 A1 | 9/2008 | Grosser |
| 2009/0120169 A1 | 5/2009 | Chandler, Jr. |
| 2010/0039109 A1 | 2/2010 | Cheng |
| 2012/0046852 A1* | 2/2012 | Alger .................... F02D 33/003 |
| | | | 123/557 |
| 2012/0083915 A1 | 4/2012 | Allan |
| 2012/0096923 A1 | 4/2012 | Weinstein et al. |
| 2014/0116107 A1 | 5/2014 | Weinstein |
| 2015/0204769 A1 | 7/2015 | Digrazia et al. |

FOREIGN PATENT DOCUMENTS

| | | | |
|---|---|---|---|
| EP | 2602547 A1 | 6/2013 | |
| GB | 762824 A | 12/1956 | |
| GB | 2259368 A | 3/1993 | |
| JP | H09119891 A | 5/1997 | |
| WO | 1997009601 A1 | 3/1997 | |
| WO | 2005103645 A2 | 11/2005 | |
| WO | WO-2013006171 A1 * | 1/2013 | ............... G01F 1/84 |
| WO | WO-2014051582 A1 * | 4/2014 | ............ G01N 11/16 |

OTHER PUBLICATIONS

Ioana Stanciu, A new viscosity-temperature relationship for vegetable oil, Journal of Petroleum Technology and 2 Alternative Fuels, vol. 3(2), pp. 19-23, Feb. 2012, Faculty of Chemistry, University of Bucharest, 4-12 Regina Elisabeta Blvd., 030018 Bucharest, Romania.

* cited by examiner

510 — Provide fuel to a vibratory meter

520 — Measure a property of the fuel with the vibratory meter

530 — Generate a signal with the measured property of the fuel

540 — Provide the signal to a temperature control unit

CONTROLLING A VISCOSITY OF FUEL IN A FUEL CONTROL SYSTEM WITH A VIBRATORY METER

CROSS-REFERENCE TO RELATED APPLICATIONS

This is a divisional application of U.S. application Ser. No. 15/577,893, filed on Nov. 29, 2017, entitled "CONTROLLING A VISCOSITY OF FUEL IN A FUEL CONTROL SYSTEM WITH A VIBRATORY METER" which is a National Stage application of International Application No. PCT/US2015/034647, filed Jun. 8, 2015.

TECHNICAL FIELD

The embodiments described below relate to fuel control systems and, more particularly, to controlling a viscosity of fuel in a fuel control system with a vibratory meter.

BACKGROUND

Heavy fuel oils (HFOs) are used in the marine industry as fuel for engines. The engine's performance is correlated with how well the fuel injectors atomize the fuel. The fuel injectors are controlled by a controller, which is typically an engine control unit (ECU), to ensure that the atomization is appropriate to achieve the desired performance. For example, the ECU can sense various parameters such as air intake pressure, fuel pressure, and fuel temperature and, from these parameters, control the fuel injector to increase or decrease the flow rate of the fuel into a combustion chamber.

The fuel properties can determine whether the fuel is appropriate for a given fuel injector. For example, the fuel at a low temperature may have a viscosity that is too high for the fuel injector. Fuel injectors typically cannot effectively atomize fuels with high viscosity or can only atomize fuels within a certain viscosity range. This is particularly true for HFOs, which have a high viscosity relative to other common fuels, such as gasoline or other distillates.

The marine industry, however, has developed sophisticated engine designs and fuel control systems that are able to utilize the HFOs, as well as other fuels, despite the wide range of viscosities in the fuel supply. These engine designs and fuel control systems employ a variety of techniques. For example, to reduce the viscosity of the fuel, the engine designs may include a heater to heat the fuel. However, the fuel is typically heated at a location that is proximate the fuel source, which may be problematic because the fuel control systems typically have long fuel supply lines that cause the fuel to cool before reaching the engine. In addition, the cooling rates along the fuel lines can vary significantly due to changing environmental conditions around the fuel lines. As a result, the viscosity of the fuel as it arrives at the engine may be at a viscosity that is not appropriate for the fuel injector.

However, the viscosity of the fuel can be controlled if the properties of the fuel are measured within a desirable degree of accuracy, which can be accomplished with a vibratory meter. Accordingly, there is a need for controlling a viscosity of fuel in a fuel control system with a vibratory meter. There is also a need for controlling the viscosity in a manner that compensates for the heat loss along the fuel lines.

SUMMARY

A method of controlling a viscosity of fuel in a fuel control system with a vibratory meter is provided. According to an embodiment, the method comprises providing the fuel to the vibratory meter, measuring a property of the fuel with the vibratory meter, generating a signal based on the measured property of the fuel, and providing the signal to a temperature control unit configured to control the temperature of the fuel provided to the vibratory meter.

A vibratory meter for controlling a viscosity in a fuel control system is provided. According to an embodiment, the vibratory meter comprises a meter assembly fluidly coupled to a fuel source and a meter electronics communicatively coupled to the meter assembly. The meter electronics is configured to measure a property of the fuel with the meter assembly, generate a signal based on the measured property and provide the signal to a temperature control unit configured to control the temperature of the fuel provided to the vibratory meter.

A fuel control system configured to control a viscosity of fuel in the fuel control system is provided. According to an embodiment, the fuel control system comprises a vibratory meter fluidly and communicatively coupled to the temperature control unit and a temperature control unit configured to receive fuel from a fuel source and communicatively and fluidly coupled to the vibratory meter. The temperature control unit is configured to receive a signal from the vibratory meter and control the temperature of the fuel based on the signal received from the vibratory meter.

ASPECTS

According to an aspect, a method of controlling a viscosity of fuel in a fuel control system with a vibratory meter comprises measuring a temperature control unit viscosity of the fuel using a temperature control unit coupled to a fuel line coupling an engine to a fuel source, providing the fuel to the Coriolis flow meter coupled to the fuel line between the temperature control unit and the engine, measuring a density of the fuel with the Coriolis flow meter, generating a signal with the Coriolis flow meter based on the density of the fuel, providing the signal based on the measured density of the fuel to the temperature control unit, determining a Coriolis flow meter viscosity of the fuel based on the density of the fuel and an empirically determined viscosity-density relationship of the fluid, and controlling the engine viscosity of the fuel, using the temperature control unit, by controlling the temperature of the fuel based on the Coriolis flow meter viscosity and the temperature control unit viscosity, wherein the signal comprises at least one of the density of the fuel or the Coriolis flow meter viscosity of the fuel.

Preferably, the method further comprises providing the signal to a fuel injection controller configured to control an engine receiving the fuel from the Coriolis flow meter.

Preferably, the step of generating the signal based on the measured density of the fuel comprises comparing a value of the measured density with a reference value, and generating a signal in proportion to the difference between the value of the measured density and the reference value.

Preferably, the temperature control unit is comprised of a heater configured to heat the fuel to reduce a viscosity of the fuel.

Preferably, the step of generating the signal based on the measured density of the fuel comprises calculating a viscosity from the measured density of the fuel.

Preferably, the measured density of the fuel is a density of the fuel.

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of embodiments of controlling a viscosity of fuel in a fuel control system with a vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of controlling the viscosity of the fuel in a fuel control system with the vibratory meter. As a result, the embodiments described below are not limited to the specific examples described below, but only by the claims and their equivalents.

Figure 1:
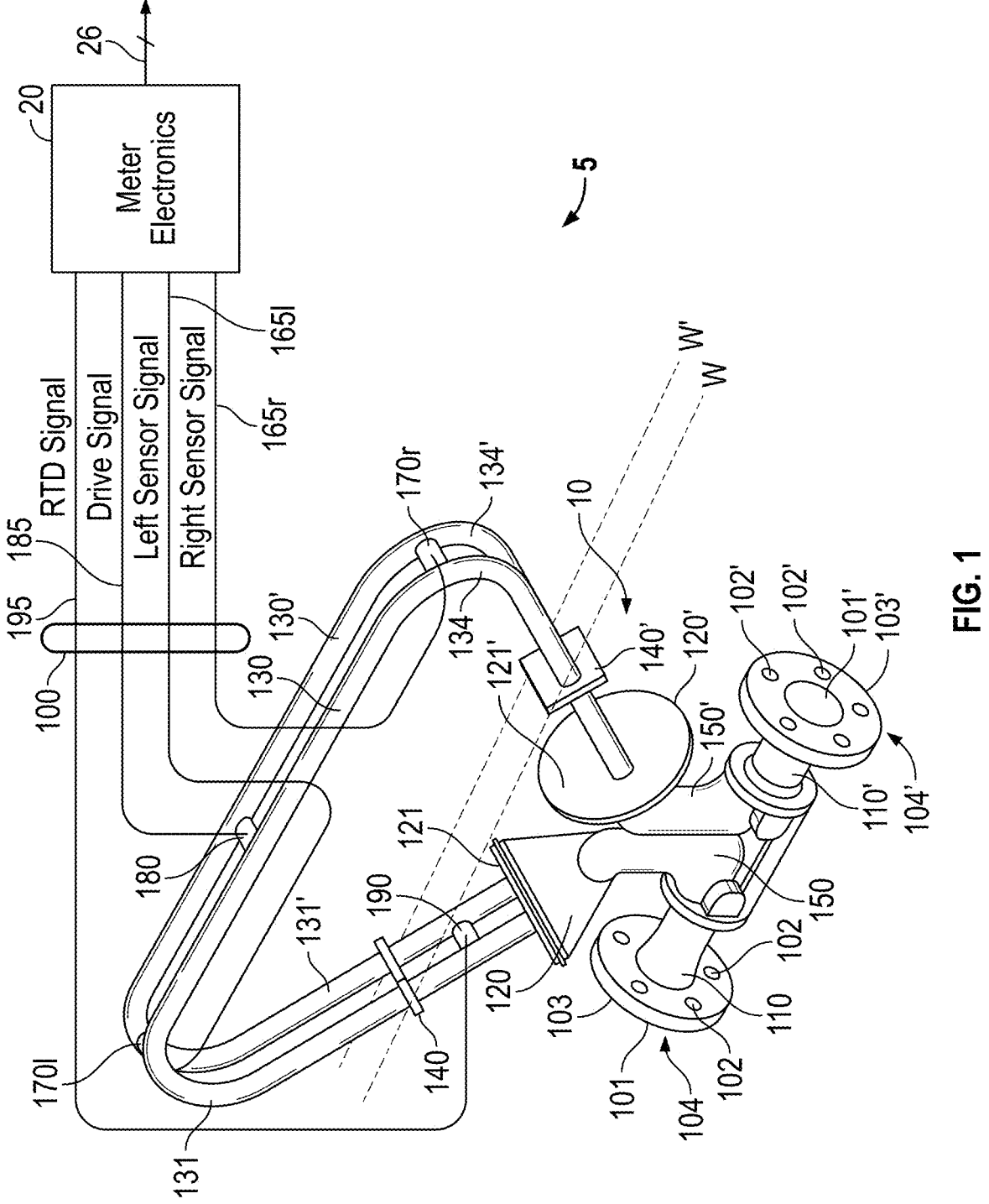
FIG. 1 shows a vibratory meter 5 for controlling a viscosity of fuel in a fuel control system according to an embodiment.

FIG. 1 shows a vibratory meter 5 for controlling a viscosity of fuel in a fuel control system according to an embodiment. As shown in FIG. 1, the vibratory meter 5 comprises a meter assembly 10 and meter electronics 20. The meter assembly 10 responds to mass flow rate and density of a process material. The meter electronics 20 is connected to the meter assembly 10 via leads 100 to provide density, mass flow rate, and temperature information over path 26, as well as other information. A Coriolis flow meter structure is described although it is apparent to those skilled in the art that the present invention could be practiced as a vibrating tube densitometer, tuning fork densitometer, or the like.

The meter assembly 10 includes a pair of manifolds 150 and 150', flanges 103 and 103' having flange necks 110 and 110', a pair of parallel flow tubes 130 and 130', drive mechanism 180, resistive temperature detector (RTD) 190, and a pair of pick-off sensors 170*l* and 170*r*. Flow tubes 130 and 130' have two essentially straight inlet legs 131, 131' and outlet legs 134, 134', which converge towards each other at flow tube mounting blocks 120 and 120'. The flow tubes 130, 130' bend at two symmetrical locations along their length and are essentially parallel throughout their length. Brace bars 140 and 140' serve to define the axis W and W' about which each flow tube 130, 130' oscillates. The legs 131, 131' and 134, 134' of the flow tubes 130, 130' are fixedly attached to flow tube mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the flow tube mounting block 120 having a surface 121. Within the manifold 150 the material is divided and routed through the flow tubes 130, 130'. Upon exiting the flow tubes 130, 130', the process material is recombined in a single stream within the block 120' having a surface 121' and the manifold 150' and is thereafter routed to outlet end 104' connected by the flange 103' having holes 102' to the process line (not shown).

The flow tubes 130, 130' are selected and appropriately mounted to the flow tube mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the flow tubes change with temperature, and this change affects the calculation of flow and density, RTD 190 is mounted to flow tube 130' to continuously measure the temperature of the flow tube 130'. The temperature of the flow tube 130' and hence the voltage appearing across the RTD 190 for a given current passing therethrough is governed by the temperature of the material passing through the flow tube 130'. The temperature dependent voltage appearing across the RTD 190 is used in a well-known method by the meter electronics 20 to compensate for the change in elastic modulus of the flow tubes 130, 130' due to any changes in flow tube temperature. The RTD 190 is connected to the meter electronics 20 by lead 195.

Both of the flow tubes 130, 130' are driven by drive mechanism 180 in opposite directions about their respective bending axes W and W' and at what is termed the first out-of-phase bending mode of the flow meter. This drive mechanism 180 may comprise any one of many well-known arrangements, such as a magnet mounted to the flow tube 130' and an opposing coil mounted to the flow tube 130 and through which an alternating current is passed for vibrating both flow tubes 130, 130'. A suitable drive signal is applied by the meter electronics 20, via lead 185, to the drive mechanism 180.

The meter electronics 20 receives the RTD temperature signal on lead 195, and the left and right sensor signals appearing on leads 165*l*, 165*r*, respectively. The meter electronics 20 produces the drive signal appearing on lead 185 to drive mechanism 180 and vibrate tubes 130, 130'. The meter electronics 20 processes the left and right sensor signals and the RTD signal to compute the mass flow rate and the density of the material passing through meter assembly 10. This information, along with other information, is applied by meter electronics 20 over path 26 as a signal.

As will be explained in more detail in the following, the signal can be used to control a viscosity of fuel in a fuel system. For example, the signal may be used to control a temperature of the fuel in the fuel system. By controlling the temperature of the fuel, the fuel provided to an engine may be within a desired range of viscosities. The signal can be generated based on a property, such as density, measured by the vibratory meter 5, as will be explained in more detail in the following.

Figure 2:
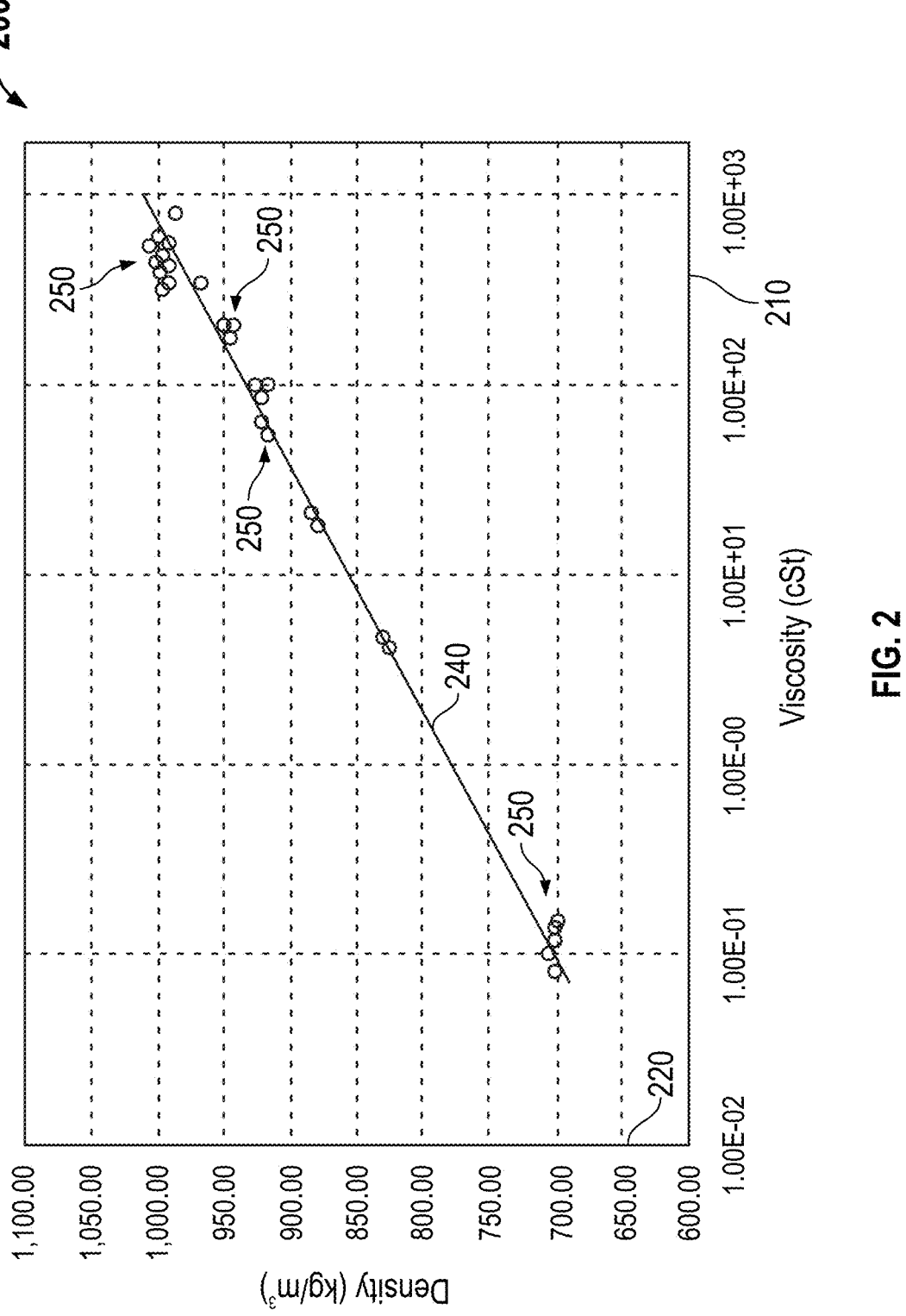
FIG. 2 shows a viscosity-density graph 200 with data illustrating a relationship between a viscosity and a density of the fuel.

FIG. 2 shows a viscosity-density graph 200 with data illustrating a relationship between a viscosity and a density of the fuel. The viscosity-density graph 200 includes a viscosity axis 210 with a logarithmic scale that ranges from 1.00E-02 to 1.00E-03 centistokes (cSt). The viscosity-density graph 200 also includes a density axis 220 that ranges from 600.00 to 1,100.00 kg/m$^3$. Although the viscosity-density relationship of the fuel is respectively expressed in units of centistokes and kg/m$^3$, other units may be employed in alternative embodiments.

The viscosity-density graph 200 shows a line 240 that is a linear fit to viscosity-density data points 250 depicted as circles. The line 240 can be calculated from the viscosity-density data points 250 using any appropriate method, such as, for example, linear regression. The line 240 may be stored as a data set, equation, or the like, in the meter electronics 20. The viscosity-density data points 250 can be determined through various means including, for example, measuring the viscosity and density of various fuel types over a range of temperatures.

As can be appreciated from FIG. 2, the line 240 is a close approximation of the viscosity-density data points 250. In other words, the viscosity-density data points 250 are relatively close to the line 240 along the entire length of the line. Accordingly, the line 240 may be used to provide a relationship, within a range of accuracy, between the density and the viscosity of the fuel. The viscosity of the fuel can be determined from the density of the fuel using the viscosity-density relationship. For example, the vibratory meter 5 can measure the density of the fuel in the vibratory meter 5. Using the measured density of the fuel, the line 240 can be used to determine a corresponding viscosity of the fuel. Other fuel properties, such as temperature, may be correlated with the viscosity of the fuel.

Figure 3:
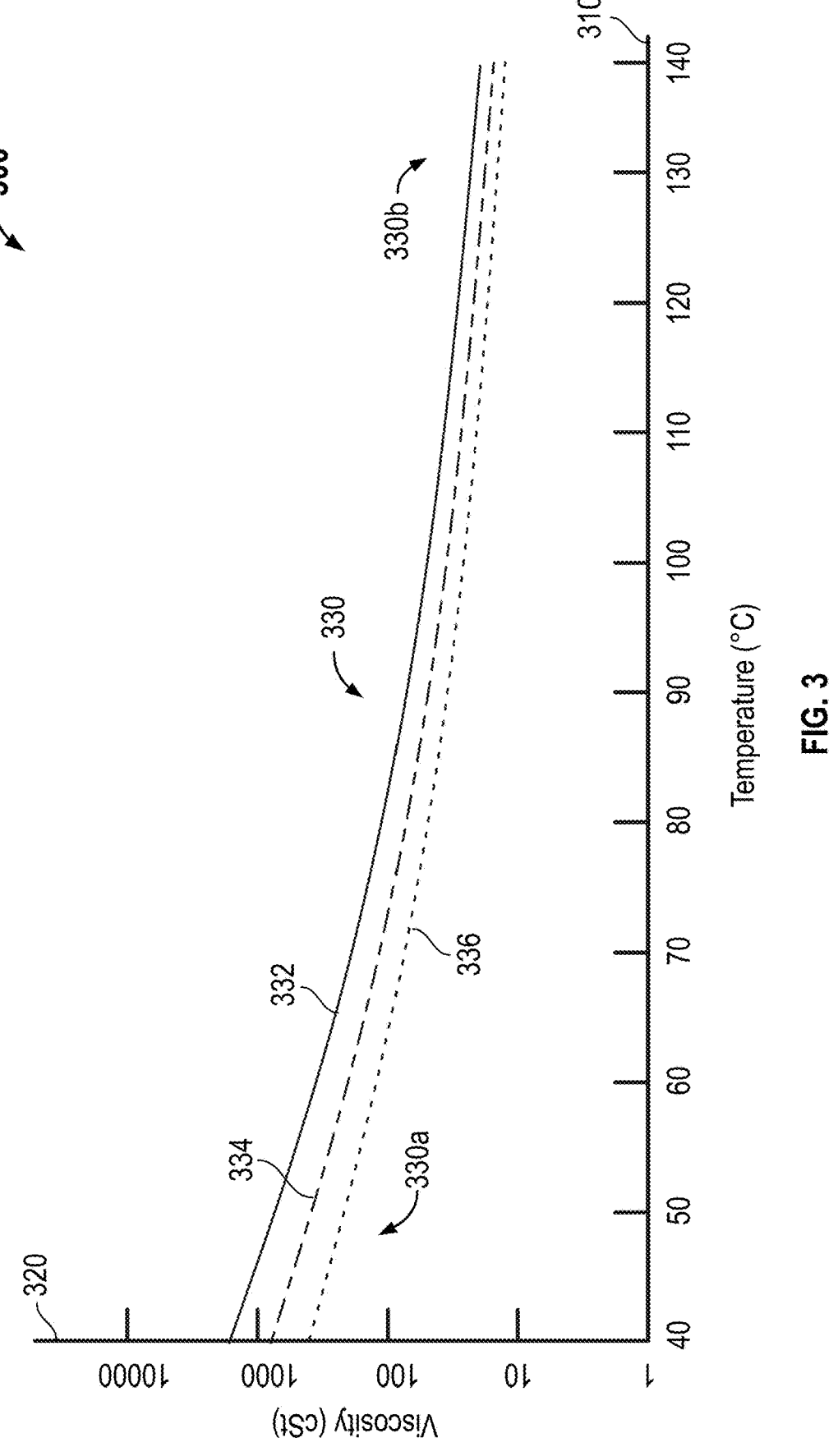
FIG. 3 shows a temperature-viscosity graph 300 illustrating a relationship between temperature and viscosity of a fuel.

FIG. 3 shows a temperature-viscosity graph 300 illustrating a relationship between a temperature and a viscosity of a fuel. The temperature-viscosity graph 300 includes a temperature axis 310 and a viscosity axis 320. The temperature axis 310 is in units of degrees Celsius (° C.) and the viscosity axis 320 is in units of centistokes (cSt). The viscosity axis 320 is shown with a logarithmic scale. In alternative embodiments, any suitable units and scales may be employed.

The temperature-viscosity graph 300 also includes temperature-viscosity plots 330 that trend down as the temperature increases. The temperature-viscosity plots 330 include a high viscosity fuel plot 332, a moderate viscosity fuel plot 334, and a low viscosity fuel plot 336. Each of the temperature-viscosity plots 330 may represent a particular grade of fuel, where the fuel grades have different viscosities. The temperature-viscosity plots 330 may be obtained in any appropriate manner such as, for example, querying empirical data of the fuel supplied to a tank, referencing a table with viscosity-fuel grade data, or the like. The temperature-viscosity graph 300 also illustrates a low temperature viscosity region 330a and an operating viscosity region 330b.

The low temperature viscosity region 330a may be the viscosity of the fuel when the fuel is not heated. For example, the low temperature viscosity region 330a may be representative of the fuel when the fuel is in the tank. As can be appreciated from FIG. 3, the low temperature viscosity region 330a has a relatively wide range of viscosities for the temperature-viscosity plots 330 at a given temperature. For example, at 40 degrees Celsius, the high viscosity fuel plot 332 has a viscosity of 2000 centistokes. The low viscosity fuel plot 336 has a viscosity of about 700 centistokes at 40 degrees Celsius. The difference between the high viscosity fuel plot 332 and the low viscosity fuel plot 336, at 40 degrees Celsius, is therefore about 1300 centistokes.

In contrast, the operating viscosity region 330b has a more narrow range of viscosities. For example, at 140 degrees Celsius, the high viscosity fuel plot 332 has a viscosity of 20 centistokes. The viscosity of the low viscosity fuel plot 336 at 140 degrees Celsius is about 15 centistokes. Accordingly, rather than the 1300 centistokes difference at 40 degrees Celsius, the difference between the high and low viscosity fuel plots 332, 336 at 140 degrees is about 5 centistokes. Accordingly, the different fuel grades in the operating viscosity region 330b may have a property, such as viscosity, that is appropriate for a fuel injector in a fuel control system, which is described in more detail in the following.

Figure 4:
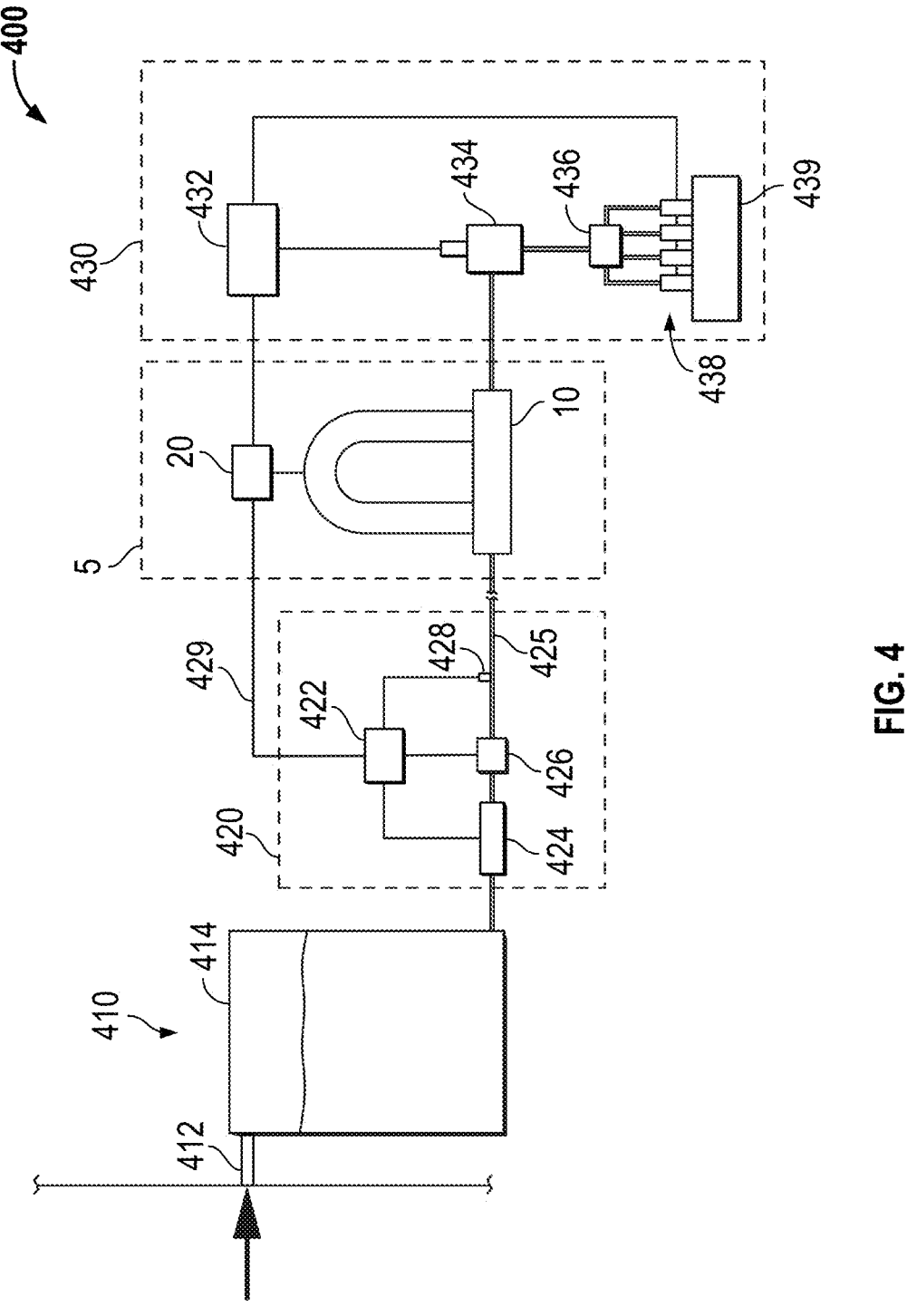
FIG. 4 shows a fuel control system 400 with the vibratory meter 5 for controlling a viscosity of fuel.

FIG. 4 shows a fuel control system 400 with the vibratory meter 5 for controlling a viscosity of fuel. The fuel control system 400 includes a fuel source 410 that is in fluid communication with a temperature control unit 420, the vibratory meter 5 described with reference to FIG. 1, and a fuel injection system 430. The temperature control unit 420 is fluidly coupled with the vibratory meter 5 via the fuel line 425. The length of the fuel line 425 is illustrated by broken lines. The temperature control unit 420 is also communicatively coupled to the vibratory meter 5 via the communications path 429, which may be a portion of the path 26 described in the foregoing with reference to FIG. 1.

In the embodiment of FIG. 4, the fuel source 410 includes a fuel port 412 and a tank 414. Shown proximate the fuel port 412 is an arrow that illustrates fuel being supplied to the fuel port 412. The tank 414 is fluidly coupled to the fuel port 412 and configured to receive the fuel supplied to the fuel port 412. The tank 414 is shown as partially filled with fuel (an exemplary fuel level being illustrated by the wavy line). Near the bottom of the tank 414 is a fuel line that fluidly couples the tank 414 to the temperature control unit 420.

The temperature control unit 420 includes a temperature controller 422 that is electrically coupled to a heater 424 configured to heat the fuel as it flows through the heater 424. The temperature controller 422 is also communicatively coupled to a viscometer 426, a temperature transducer 428, and the meter electronics 20 in the vibratory meter 5. As can be appreciated from FIG. 4, the fuel can flow from the tank 414 to the fuel line 425 through the heater 424 and the viscometer 426. The temperature transducer 428 can measure the temperature of the fuel and provide a signal to the temperature controller 422.

The temperature controller 422 can be configured to provide power, such as, for example, electrical power to the heater 424. The power provided to the heater 424 may be proportional to the heat that is transferred from the heater 424 to the fuel flowing through the heater 424. The power provided to the heater 424 may be proportional to a difference between the temperature measured by the temperature transducer 428 and a temperature reference.

The temperature controller 422 can also receive a signal with information about the fuel flowing through the viscometer 426. For example, the temperature controller 422 can receive a voltage signal from the viscometer 426 that is proportional to the viscosity of the fuel. Alternatively, the viscometer 426 may provide a digital value that represents the viscosity of the fuel. Other means of providing the information to the temperature controller 422 may be employed in alternative embodiments. Similarly, the temperature controller 422 can receive a signal from the temperature transducer 428 that includes information about the temperature of the fuel flowing through the fuel line 425. The measured temperature may be the temperature of the fuel, the fuel line, surrounding air, etc.

Although the foregoing describes an embodiment of the temperature control unit 420 that includes the temperature controller 422, the heater 424, the viscometer 426, and the temperature transducer 428, alternative embodiments may have different configurations. For example, embodiments may not include the viscometer 426 and, instead, may rely on the vibratory meter 5 to determine the viscosity of the fuel. However, the viscometer 426 may be advantageous because it can measure the viscosity of the fuel as the fuel exits the heater 424 and provide information about the viscosity to the temperature controller 422 and/or the meter electronics 20, which can compare the viscosity with measurements made by the meter assembly 10. It can also be appreciated that the temperature controller 422 may not be part of the temperature control unit 420. For example, the temperature control unit 420 could be part of the meter electronics 20 in the vibratory meter 5 described in the foregoing with reference to FIG. 1.

In FIG. 4, the vibratory meter 5 is shown with the meter electronics 20 in communication with the meter assembly 10. The meter electronics 20 is also shown to be communicatively coupled to the temperature control unit 420 and the fuel injection system 430. The meter electronics 20 may be configured to provide a signal to the temperature control unit 420 and/or the fuel injection system 430. For example, the meter electronics 20 may receive a measurement, such a density of the fuel in the meter assembly 10, and calculate a reference value that can be sent to the temperature control unit 420 and/or the fuel injection system 430.

The fuel injection system 430 is shown as including a fuel injection controller 432 that is communicatively coupled to the meter electronics 20. The fuel injection controller 432 is also communicatively coupled to a fuel pump 434 and fuel injectors 438. The fuel pump 434 is fluidly coupled to the fuel injectors 438 via a fuel distributor 436. The fuel pump 434 is configured to supply fuel at a pressure to the fuel injectors 438 through the fuel distributor 436. The fuel injectors 438 inject fuel into an engine 439.

The fuel injection controller 432 is configured to control the parameters of the fuel injection system 430. For example, the fuel injection controller 432 can regulate the pressure of the fuel exiting the fuel pump 434. Accordingly, the pressure at the fuel injectors 438 can be a desired value. Other parameters, such as operating parameters of the fuel injectors 438, may also be controlled.

In the embodiment shown in FIG. 4, the fuel injection controller 432 can control the parameters of the fuel injection system 430 based on the signal received from the meter electronics 20. For example, the meter electronics 20 could generate and provide a signal with information about the fuel flowing through the meter assembly 10. The information can include, for example, density, viscosity, and temperature of the fuel. Using the information, the fuel injection controller 432 may determine the desired operating parameters of the fuel injection system 430. For example, the fuel injection controller 432 may adjust the fuel pressure leaving the fuel pump 434 based on the viscosity of the fuel.

In alternative embodiments, the fuel injection system 430 may not be in communication with the meter electronics 20. Accordingly, the fuel injection system 430 may not receive information about the viscosity or temperature of the fuel. In the foregoing described and other embodiments, the fuel control system 400 may control the viscosity of the fuel, as will be described in more detail in the following.

Figure 5:
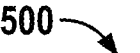
FIG. 5 shows a method 500 of controlling a viscosity of fuel in a fuel control system with a vibratory meter according to an embodiment.
Figure 5:
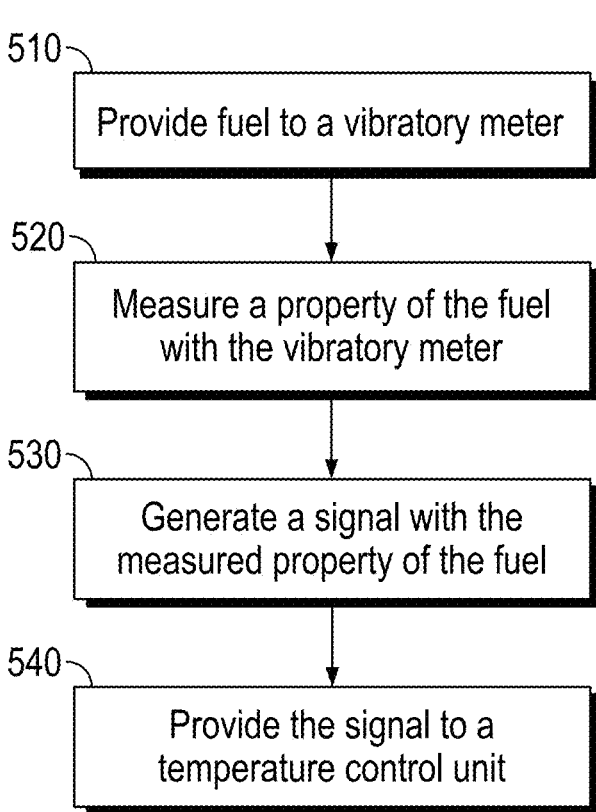

FIG. 5 shows a method 500 for controlling a viscosity of fuel in a fuel control system with a vibratory meter according to an embodiment. The method 500 begins with step 510 by providing fuel to a vibratory meter. For example, referring to the fuel control system 400 described in the foregoing, the method 500 can provide fuel from the fuel source 410 to the vibratory meter 5 via the temperature control unit 420. In step 520, a property of the fuel is measured by the vibratory meter. The property of the fuel may include a density, temperature, or the like. In step 530, the method 500 may generate a signal based on the measured property of the fuel. For example, the generated signal may be based on a viscosity calculated from a density measurement using a relationship between fuel properties. In step 540, the method 500 provides the generated signal to a temperature control unit, such as the temperature control unit 420 described in the foregoing with reference to FIG. 4.

For example, with reference to the embodiment shown in FIG. 2, the line 240 may be employed to determine a viscosity from a measured density. The meter electronics 20 can receive the measured density of the fuel via the leads 100 described with reference to FIG. 1. The measured density can be used as a dependent variable in calculating a corresponding determined viscosity. The measured density may be employed as it is received by the meter electronics 20 or stored in the meter electronics 20 for later use. Using the measured density and the line 240 described in the foregoing, the viscosity of the fuel in the meter assembly 10 can be determined. The determined viscosity may then be used to calculate a reference value.

The reference value compensates for the distance between the temperature control unit 420 and the vibratory meter 5. As discussed in the foregoing, the distance between the temperature control unit 420 and the vibratory meter 5 is illustrated in FIG. 4 as broken lines in the fuel line 425. Due to this distance, the fuel will cool after being heated by the heater 424. The reference value may therefore compensate for the cooling of the fuel as it flows through the fuel line 425. Other factors, such as, for example, a mass flow rate of the fuel through the fuel line 425 may also be compensated.

The reference value may be provided to the temperature control unit 420 by the meter electronics 20 via a generated signal. For example, the meter electronics 20 can generate a digital representation of the reference value and modulate a signal with the digital representation. Accordingly, the generated signal provided by the meter electronics 20 may be the signal modulated by the digital representation of the reference value. Other methods may be employed, such as, for example, an analog direct current (DC) voltage that is proportional to the reference value. In an embodiment, the signal may be proportional to the difference between a measured value and the reference value.

The reference value provided by the meter electronics 20 may be any appropriate value that can be employed to control the viscosity of the fuel. For example, the reference value provided to the temperature control unit 420 may be a reference viscosity. That is, the meter electronics 20 can determine the viscosity from the measured density of the fuel in the meter assembly 10 and calculate the reference viscosity using one of the temperature-viscosity plots 330 by employing a measured temperature provided by the temperature control unit 420. The temperature control unit 420 can calculate the reference temperature from the reference viscosity using, for example, one of the temperature-viscosity plots 330 shown in FIG. 3.

In an alternative embodiment, the reference value provided by the meter electronics 20 may be the reference temperature. In this embodiment, the meter electronics 20 may provide the reference temperature to the temperature control unit 420. The temperature control unit 420 may receive the reference temperature and heat the fuel to the reference temperature with the heater 424. Additionally or alternatively, the meter electronics 20 may provide other reference values.

Using the reference temperature, the temperature control unit 420 can employ any suitable control means, such as, for example, proportional-integral-differential (PID) control algorithms. For example, the control means may compare the reference temperature that is provided by the meter electronics 20 or determined by the temperature control unit 420 with the temperature measured by the temperature transducer 428 and adjust the amount of power provided to the heater 424 based on the comparison. The amount of power provided may be proportional to the difference between the reference temperature and the measured temperature.

Due to the vibratory meter 5 being in the fuel control system 400 at a different location than the temperature control unit 420, the reference temperature provided to the temperature control unit 420 may not be the same as a desired temperature for the fuel flowing through the meter assembly 10. The difference can be proportional to the distance between the temperature control unit 420 and the vibratory meter 5. The distance between the temperature control unit 420 and the vibratory meter 5 may be, for example, 100 meters, although any distance may be present in alternative embodiments. Accordingly, the reference temperature can be higher than the desired fuel temperature at the vibratory meter 5.

The embodiments described above control a viscosity of fuel in a fuel control system 400 with a vibratory meter 5. As explained in the foregoing, the viscosity of the fuel in the fuel control system 400 may be controlled by controlling the temperature of the fuel. The temperature may be controlled by a temperature control unit 420 with, for example, the heater 424. The heater 424 may heat the fuel to a reference temperature. Therefore, the fuel entering the fuel injection system 430 may have appropriate fuel properties. For example, the viscosity of the fuel in the fuel injection system 430 may be within the operating viscosity region 330b shown in FIG. 3.

In some embodiments, the determined viscosity can be provided to a fuel injection system 430. For example, the fuel injection controller 432 can control various parameters in the fuel injection system 430 using the determined viscosity. Therefore, the fuel pump 434 and the fuel injectors 438 can be controlled in a manner appropriate for the fuel that is being received by the fuel injection system 430. For example, the fuel pressure of the fuel exiting the fuel pump 434 may be appropriate for the viscosity determined by the vibratory meter 5.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other vibratory meters that control a viscosity of fuel in a fuel control system and not just to the embodiments described above and shown in the accompanying figures. Accordingly, the scope of the embodiments described above should be determined from the following claims.

We claim:

1. A method of controlling a viscosity of fuel in a fuel control system with a vibratory meter, the method comprised of:

measuring a temperature control unit viscosity of the fuel using a temperature control unit coupled to a fuel line coupling an engine to a fuel source;

providing the fuel to the Coriolis flow meter coupled to the fuel line between the temperature control unit and the engine; measuring a density of the fuel with the Coriolis flow meter;

generating a signal with the Coriolis flow meter based on the density of the fuel;

providing the signal based on the measured density of the fuel to the temperature control unit;

determining a Coriolis flow meter viscosity of the fuel based on the density of the fuel and an empirically determined viscosity-density relationship of the fuel; and controlling the engine viscosity of the fuel, using the temperature control unit, by controlling the temperature of the fuel based on the Coriolis flow meter viscosity and the temperature control unit viscosity, wherein the signal comprises at least one of the density of the fuel or the Coriolis flow meter viscosity of the fuel.

2. The method of claim 1, further comprising providing the signal to a fuel injection controller configured to control an engine receiving the fuel from the Coriolis flow meter.

3. The method of claim 1, wherein the step of generating the signal based on the measured density of the fuel comprises:

comparing a value of the measured density with a reference value; and generating a signal in proportion to the difference between the value of the measured density and the reference value.

4. The method of claim 1, wherein the temperature control unit is comprised of a heater configured to heat the fuel to reduce a viscosity of the fuel.

5. The method of claim 1, wherein the step of generating the signal based on the measured density of the fuel comprises calculating a viscosity from the measured density of the fuel.

6. The method of claim 1, wherein the measured density of the fuel is a density of the fuel.

\* \* \* \* \*